United States Patent
Yoon

(10) Patent No.: US 11,772,268 B2
(45) Date of Patent: Oct. 3, 2023

(54) ROBOT COLLISION DETECTION DEVICE AND METHOD THEREOF

(71) Applicants: Hyundai Motor Company, Seoul (KR); Kia Corporation, Seoul (KR)

(72) Inventor: Il Yong Yoon, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 134 days.

(21) Appl. No.: 17/486,364

(22) Filed: Sep. 27, 2021

(65) Prior Publication Data
US 2022/0266452 A1     Aug. 25, 2022

(30) Foreign Application Priority Data
Feb. 22, 2021   (KR) .................. 10-2021-0023603

(51) Int. Cl.
B25J 9/16        (2006.01)
B25J 13/08       (2006.01)

(52) U.S. Cl.
CPC .......... B25J 9/1676 (2013.01); B25J 9/1651 (2013.01); B25J 9/1653 (2013.01); B25J 13/088 (2013.01)

(58) Field of Classification Search
CPC .......... G05B 2219/37624; G05B 2219/37627; G05D 1/027; G05D 1/0214; B25J 9/1676; B25J 9/1651; B25J 9/1653; B25J 13/088; B25J 9/1664; B25J 9/1674; B25J 9/1694
See application file for complete search history.

(56) References Cited

U.S. PATENT DOCUMENTS

| | | | |
|---|---|---|---|
| 2005/0104549 A1* | 5/2005 | Nishimura | B25J 9/1651 318/568.24 |
| 2006/0095160 A1* | 5/2006 | Orita | G05D 1/027 700/248 |
| 2007/0229015 A1* | 10/2007 | Yoshida | G05B 19/4061 700/245 |
| 2017/0120448 A1* | 5/2017 | Lee | G05D 1/0214 |
| 2018/0099422 A1* | 4/2018 | Yoon | B25J 19/06 |
| 2019/0389459 A1* | 12/2019 | Berntorp | B60W 30/18163 |
| 2020/0086837 A1* | 3/2020 | Le Cornec | G01C 21/3407 |
| 2020/0189100 A1* | 6/2020 | Rácz | G05B 19/4103 |
| 2021/0206388 A1* | 7/2021 | Smith | B60W 60/0015 |
| 2021/0259170 A1* | 8/2021 | Marder-Eppstein | A01G 27/008 |
| 2022/0055212 A1* | 2/2022 | Pong | B25J 9/1664 |

FOREIGN PATENT DOCUMENTS

| | | |
|---|---|---|
| KR | 100811540 B1 | 3/2008 |
| KR | 101981175 B1 | 5/2019 |

* cited by examiner

*Primary Examiner* — Adam R Mott
*Assistant Examiner* — Sagar K C
(74) *Attorney, Agent, or Firm* — Fox Rothschild LLP

(57) ABSTRACT

A robot collision detection device and a method thereof are provided. The robot collision detection device includes a buffer that periodically stores a driving command for allowing a robot to move to a destination and a sensor that detects a behavior of the robot. A controller monitors the driving command and a behavior of the robot corresponding to the driving command, and determines whether there is a robot collision based on the driving command and the behavior of the robot.

16 Claims, 5 Drawing Sheets

ROBOT COLLISION DETECTION DEVICE AND METHOD THEREOF

CROSS-REFERENCE TO RELATED APPLICATION

This application claims the benefit of priority to Korean Patent Application No. 10-2021-0023603, filed on Feb. 22, 2021, the entire contents of which are incorporated herein by reference.

TECHNICAL FIELD

The present disclosure relates to a technology for detecting or determining a collision of a robot equipped with a wheel.

BACKGROUND

In general, robots are mechanical devices capable of performing tasks such as movement according to commands or specific operations provided by a system, and are used for various tasks on behalf of humans. Meanwhile, the robot industry has developed rapidly and is expanding into research on robots for industrial or special work, as well as research on robots made for the purpose of helping humans work, such as home and educational robots. Most of the robots are industrial robots such as manipulators and transfer robots for the purpose of automating and unmanned production work in factories.

Recently, as the uses of robots are being diversified, movements and positions of robots are also becoming more complex. In particular, robots capable of performing human-like motions are in the spotlight as a system that is essential in an environment in which a specific work environment is mostly set based on human-beings. When humans and robots share a work space, the robot needs to guarantee the safety of humans as a top priority as well as work performance. Various studies are being conducted to implement a safe robot.

Research to implement a safe robot is largely classified into a technology that predicts and avoids collisions in advance using a non-contact sensor, a technology that mechanically absorbs a collision force caused by a collision, and a technology that detects and deals with collisions in a short time. A technology that predicts and avoids collisions using non-contact sensors such as distance sensors or image sensors in advance can guarantee fundamental safety conceptually. However, the technology does not predict collisions in a sensor's blind area, and is difficult to be applied to a fast moving manipulator due to uncertainty of image processing and time delay caused by high computational amount. The technology that mechanically absorbs a collision force caused by the collision of the robot has the advantage of ensuring human safety even in the case of abnormal operation of an electric device, but increases the size thereof due to the configuration of an additional mechanical part and degrades the working performance of the robot such as precision and control performance.

A technology that deals with a collision by detecting a collision occurring in a robot in a short time can be applied to a manipulator because an additional mechanical part configuration is not required and does not need to consider a blind area. In addition, since the technology has the advantage of ensuring human safety while maintaining the existing robot performance, the technology is attracting attention as a strategy for implementing a safe manipulator.

Research using a torque sensor, a force sensor, or a tactile sensor is in progress to detect a collision occurring in a robot in a short time, but there is a problem that the torque sensor, force sensor, or tactile sensor is expensive. In addition, complex dynamic model computation is required to determine whether there is a collision based on information detected by the sensor mentioned above.

The matters described in this background are prepared to enhance an understanding of the background of the present disclosure, and may include matters other than the prior art already known to those of ordinary skill in the field to which this technology belongs.

SUMMARY

The present disclosure has been made to solve the above-mentioned problems occurring in the prior art while advantages achieved by the prior art are maintained intact. An aspect of the present disclosure provides a robot collision detection device and method capable of monitoring a driving command for allowing a robot to move to a destination and a behavior of the robot corresponding to the driving command and determining whether there is a collision based on a difference between the driving command and the behavior to more quickly and accurately detect a collision of a robot, thereby preventing further damage that may occur in the robot in advance.

The objects of the present disclosure are not limited to the above-mentioned objects, and other objects and advantages of the present disclosure which are not mentioned may be understood by the following description, and will be more clearly understood by embodiments of the present disclosure. It will also be readily apparent that the objects and advantages of the disclosure may be realized by means of the instrumentalities and combinations particularly pointed out in the appended claims.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a robot collision detection device may include a buffer that periodically stores a driving command for allowing a robot to move to a destination, a sensor configured to detect a behavior of the robot, and a controller configured to monitor the driving command and a behavior of the robot corresponding to the driving command, and determine whether there is a robot collision based on the driving command and the behavior of the robot.

In an embodiment, the driving command may contain a speed and an angular velocity, and the sensor may be configured to measure an acceleration and an angular velocity of the robot. The robot collision detection device may further include a storage configured to store a first lookup table in which a delay time between the speed of the robot and the driving command corresponding to the speed of the robot is recorded, and a second lookup table in which reference values are recorded for speeds of the robot. The controller may be configured to detect, from the buffer, a driving command corresponding to the behavior of the robot detected by the sensor based on the first lookup table.

In addition, the controller may be configured to calculate the speed of the robot by integrating the acceleration of the robot measured by the sensor, detect a delay time in the first lookup table using the calculated speed of the robot, and detect, from the buffer, a driving command matching the behavior of the robot detected by the sensor based on the delay time. The controller may be configured to calculate a difference (D) between the speed and the angular velocity of the robot and a speed and an angular velocity of the driving command matching the speed and the angular velocity based on [Equation 1].

The controller may be configured to detect a reference value corresponding to the behavior of the robot detected by the sensor based on the second lookup table. In addition, the controller may be configured to determine that a collision has occurred in the robot when the calculated difference (D) exceeds the detected reference value. The controller may be configured to stop the robot by generating a braking signal when it is determined that a collision has occurred in the robot.

In an embodiment, the controller may be configured to audibly or visually output that a collision has occurred in response to determining that the collision has occurred in the robot. The controller may be configured to notify an administrator terminal or a control server that a collision has occurred in response to determining that the collision has occurred in the robot. The controller may be configured to generate z-axis speed data based on 3D map data, and determine whether the robot has passed by an object based on the z-axis speed data. In addition, the sensor may be an IMU (Inertial Measurement Unit).

According to an aspect of the present disclosure, a robot collision detection method may include periodically storing, by a buffer, a driving command for allowing a robot to move to a destination, detecting, by a sensor, a behavior of the robot; and monitoring, by a controller, the driving command and a behavior of the robot corresponding to the driving command, and determining whether there is a robot collision based on the driving command and the behavior of the robot.

In an embodiment, the robot collision detection method may further include storing, by storage, a first lookup table in which a delay time between the speed of the robot and the driving command corresponding to the speed of the robot is recorded, and a second lookup table in which reference values are recorded for speeds of the robot. In addition, the determining of whether there is the robot collision may include detecting a driving command corresponding to the behavior of the robot detected by the sensor from the buffer based on the first lookup table.

The determining of whether there is the robot collision may include calculating a speed of the robot by integrating the acceleration of the robot measured by the sensor, detecting a delay time from the first lookup table using the calculated speed of the robot, and detecting, from the buffer, a driving command matching the behavior of the robot detected by the sensor based on the delay time. In an embodiment, the determining of whether there is a robot collision may include calculating a difference (D) between a speed and an angular velocity of the robot and a speed and an angular velocity of the driving command matching the speed and the angular velocity of the robot, detecting a reference value corresponding to the behavior of the robot detected by the sensor based on the second lookup table, and determining that a collision has occurred in the robot when the calculated difference (D) exceeds the detected reference value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
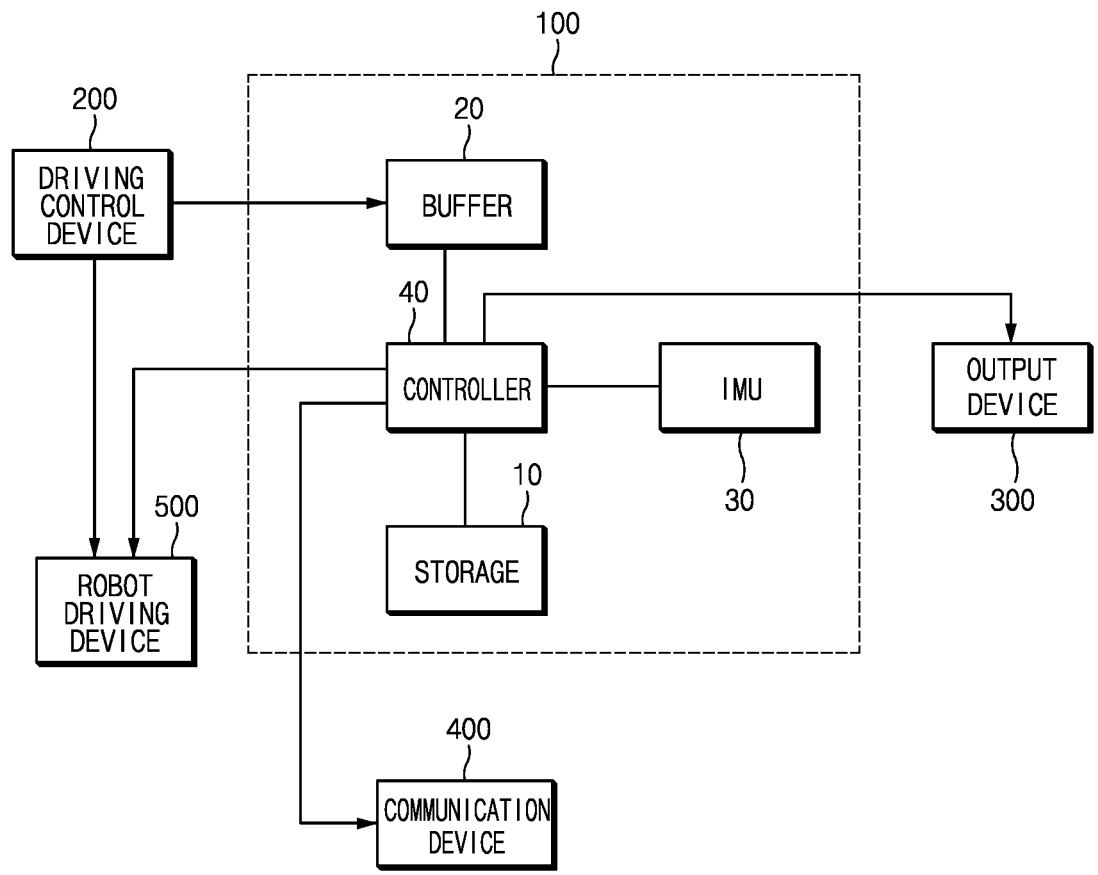
FIG. 1 is a configuration diagram of a robot collision detection device according to an embodiment of the present disclosure.

Hereinafter, some embodiments of the present disclosure will be described in detail with reference to the exemplary drawings. In adding reference numerals to the components of each drawing, it should be noted that the same reference numerals are assigned to the same components as much as possible even though they are shown in different drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

FIG. 1 is a configuration diagram of a robot collision detection device according to an embodiment of the present disclosure. Referring to FIG. 1, a robot collision detection device 100 according to an embodiment of the present disclosure may include storage 10, a buffer 20, an IMU (Inertial Measurement Unit) 30, and a controller 40. In particular, according to a method of implementing the robot collision detection device 100 according to an embodiment of the present disclosure, components may be combined with each other as one entity, or some components may be omitted.

The components will be described below in detail. First, the storage 10 may be configured to store various logics, algorithms, and programs required in a process of monitoring a driving command for allowing the robot to move to a destination and a behavior of the robot corresponding to the driving command, and determining whether there is a robot collision based on a difference between the driving command and the behavior of the robot. Particularly, the driving command may include a speed and an angular velocity of the robot for traveling to the destination, and the behavior of the robot may also be expressed in terms of speed and angular velocity. The driving command (speed and angular velocity) may be determined by a driving control device 200 based on a path to the destination and an obstacle on the path, and the speed indicating the behavior of the robot may be obtained by integrating an acceleration measured by the IMU 30. The driving control device 200 may include a timestamp in the driving command.

The storage 10 may be configured to store a lookup table 1 in which a delay time between the speed of the driving command and the behavior of the robot corresponding to the speed is recorded. For reference, a time delay occurs until the behavior of the robot corresponding to the driving command appears after the driving command generated by the driving control device 200 has been transmitted to a robot driving device 500. The lookup table 1 is shown in Table 1 below as an example.

TABLE 1

| Speed of driving command | Delay time (s) |
|---|---|
| 0.1 m/s | 0.1 |
| 0.5 m/s | 0.2 |
| 1.0 m/s | 0.3 |

In Table 1, when the speed of the driving command is 0.1 m/s, the driving command matches a measurement value of the IMU 30, which is delayed by 0.1 seconds, and when the speed of the driving command is 0.5 m/s, the driving command matches a measurement value of the IMU 30, which is delayed by 0.2 seconds, and when the speed of the driving command is 1.0 m/s, the driving command matches a measurement value of the IMU 30, which is delayed by 0.3 seconds. Although the three speeds have been described as examples in Table 1, the speeds are not limited thereto, and the controller 40 may be configured to estimate a median value of two values by using an interpolation method or the like.

The storage 10 may store a lookup table 2 in which a delay time between a speed of the robot (actual driving speed of the robot) and a driving command corresponding to the speed is recorded. The lookup table 2 is shown in Table 2 below as an example.

TABLE 2

| Speed of robot | Delay time (s) |
|---|---|
| 0.1 m/s | 0.1 |
| 0.5 m/s | 0.2 |
| 1.0 m/s | 0.3 |

In Table 2, when the speed of the robot is 0.1 m/s, the speed of the robot is a value delayed by 0.1 seconds from the driving command, and matches a driving command before 0.1 seconds. When the speed of the robot is 0.5 m/s, the speed of the robot is a value delayed by 0.2 seconds from the driving command, and matches a driving command before 0.2 seconds. When the speed of the robot is 1.0 m/s, the speed of the robot is a value delayed by 0.3 seconds from the driving command, and matches a driving command before 0.3 seconds. Although the three speeds have been described as examples in Table 2, the speeds are not limited thereto, and the controller 40 may estimate a median value of two values by using an interpolation method or the like.

The storage 10 may be configured to store a lookup table 3 in which a reference value corresponding to the speed of the driving command is recorded. In particular, the reference value is a value used by the controller 40 to determine whether there is a robot collision. The lookup table 3 is shown in Table 3 below as an example.

TABLE 3

| Speed of driving command | Reference value |
|---|---|
| 0.1 m/s | 0.01 |
| 0.5 m/s | 0.02 |
| 1.0 m/s | 0.03 |

The storage 10 may be configured to store a lookup table 4 in which a reference value corresponding to a speed of the robot (actual driving speed of the robot) is recorded. The lookup table 4 is shown in Table 4 below as an example.

TABLE 4

| Speed of robot | Reference value |
|---|---|
| 0.1 m/s | 0.01 |
| 0.5 m/s | 0.02 |
| 1.0 m/s | 0.03 |

The storage 10 may include at least one type of storage medium of a flash memory type, a hard disk type, a micro type, and a card type (e.g., an Secure Digital Card (SD card) or an eXtream Digital card (XD card)) of memory, a Random Access Memory (RAM), a Static RAM (SRAM), a Read-Only Memory (ROM), a Programmable ROM (PROM), an Electrically Erasable PROM (EEPROM), a Magnetic Memory (MRAM), a magnetic disk, and an optical disk type of memory.

The buffer 20 may be configured to periodically store a driving command generated by the driving control device 200. In particular, the driving command may include a timestamp indicating a generation time point. The size of the buffer 20 may be determined based on the delay time recorded in the lookup table 1 or the lookup table 2. For example, when the maximum delay time recorded in the lookup table 1 or the lookup table 2 is 3 seconds, the buffer 20 needs to store all driving commands for 3 seconds.

The IMU 30 is a sensor mounted on the robot and configured to measure an acceleration and an angular velocity representing a behavior of the robot. This IMU 30 may be equipped with a 3-axis accelerometer and a 3-axis gyroscope and may be configured to measure an acceleration of the robot in the traveling direction (x), an acceleration of the robot in the lateral direction (y), an acceleration of the robot in the height direction (z), and a yaw, a pitch, and a roll as an angular velocity of the robot. The IMU 30 may be mounted at a lower end of the robot to minimize errors caused by the shaking of the robot, and is preferably located in a center at same separation distances from driving motors provided in the robot to offset vibration effects caused by the driving motors.

The controller 40 may be configured to perform overall control such that each of the above components normally performs its function. The controller 40 may be implemented in the form of hardware or software, or may be implemented in a combination of hardware and software. Preferably, the controller 40 may be implemented with a microprocessor, but is not limited thereto. Specifically, the controller 40 may be configured to perform various controls in a process of monitoring a driving command for allowing the robot to move to a destination and a behavior of the robot corresponding to the driving command, and determining whether there is a robot collision based on a difference between the driving command and the behavior of the robot.

Hereinafter, the operation of the controller 40 will be described in detail. The controller 40 may be configured to detect, from the buffer 20, a driving command corresponding to the behavior of the robot detected by the IMU 30 based on the lookup table 1 or the lookup table 2 stored in the storage 10. In other words, the controller 40 may be configured to calculate a speed of the robot by integrating the acceleration of the robot measured by the IMU 30, identify a delay time in the lookup table 2 using the calculated speed of the robot, and detect a driving command matching the behavior of the robot detected by the IMU 30 from the buffer 20 based on the delay time. In particular, the controller 40 may include an integrator (not shown).

The controller 40 may be configured to calculate a difference between the behavior of the robot detected by the IMU 30 and a driving command which matches the behavior of the robot. In other words, the controller 40 may be configured to calculate a difference between a speed of the robot, which is calculated by integrating an acceleration of the robot measured by the IMU 30 and an angular velocity of the robot measured by the IMU 30, and a speed and an angular velocity of a driving command corresponding to the speed and the angular velocity. For example, the controller 40 may be configured to calculate the difference D based on Equation 1 below.

$$D = \alpha \times \sum_{i=x,y,z} \max(v_i^{DC} - v_i^{IMU}, 0) + \beta \times \sum_{i=x,y,z} \max(\omega_i^{DC} - \omega_i^{IMU}, 0) \quad \text{Equation 1}$$

Where i denotes three axes, 'max' denotes an operator that selects a larger value from two values, v denotes a speed, ω denotes an angular velocity, α and β denote constants, each meaning a weight, DC represents a driving command, and IMU represents a behavior of the robot.

The controller 40 may be configured to detect a reference value corresponding to the behavior of the robot detected by the IMU 30 based on the lookup table 3 or the lookup table 4 stored in the storage 10. The controller 40 may be configured to determine whether there is a robot collision by comparing the detected reference value with the calculated difference D. For example, when the difference D exceeds the reference value, the controller 40 may be configured to determine that a collision has occurred in the robot, and when the difference D does not exceed the reference value, determine that a collision has not occurred in the robot.

In response to determining that a collision has occurred in the robot, the controller 40 may be configured to stop the robot by transmitting a braking signal to the robot driving device 500, thereby preventing further damage that may occur to the robot in advance. In response to determining that a collision has occurred in the robot, the controller 40 may be configured to notify that a collision has occurred through an output device 300. In particular, the output device 300 may be configured to audibly or visually output that a collision has occurred. In response to determining that a collision has occurred in the robot, the controller 40 may be configured to notify an external administrator terminal or a control server of the collision through a communication device 400.

Figure 2:
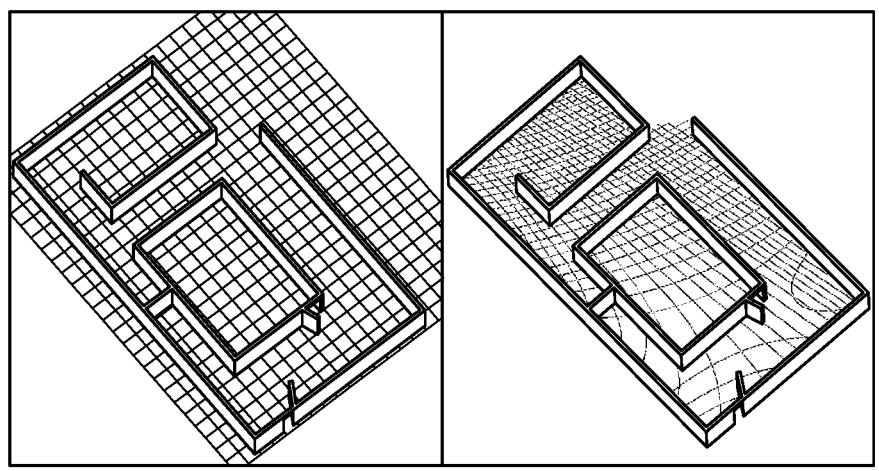
FIG. 2 is an exemplary view of 3D map data stored in a storage device provided in a robot collision detection device according to an embodiment of the present disclosure.
Figure 3:
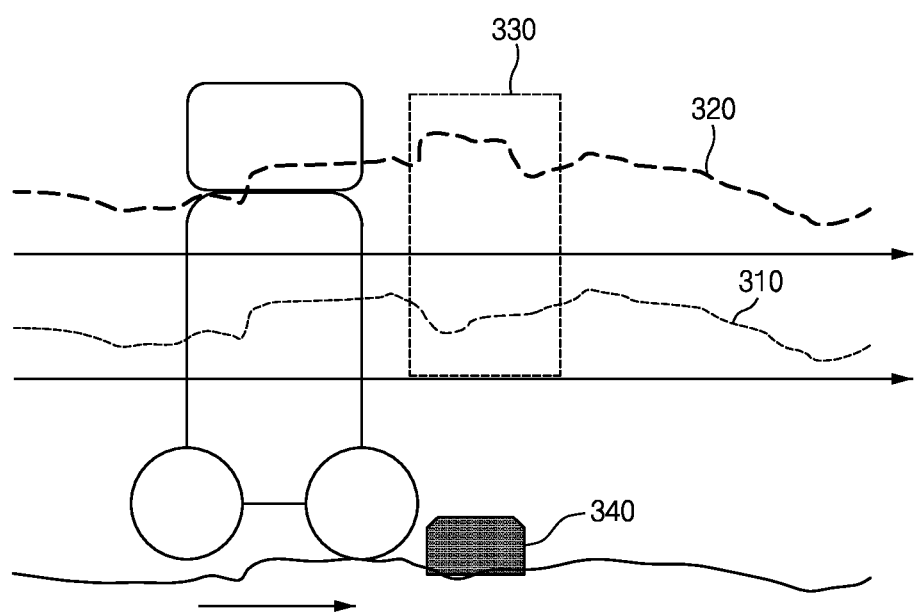
FIG. 3 is an exemplary view showing a process in which a controller provided in a robot collision detection device according to an embodiment of the present disclosure determines whether a robot passes an obstacle.

On the other hand, the controller 40 may be configured to determine a case in which the robot has stepped on and passed by a small object 340. For example, the storage 10 may be configured to store three-dimensional (x, y, z) map data as shown in FIG. 2, and store z-axis speed data generated based on the map data as reference speed data 310. When the controller 40 acquires z-axis speed data such as '320' at a specific position 330 as shown in FIG. 3, the controller 40 may be configured to determine that the robot has stepped on and passed by the object 340 at the specific position 330.

Figure 4:
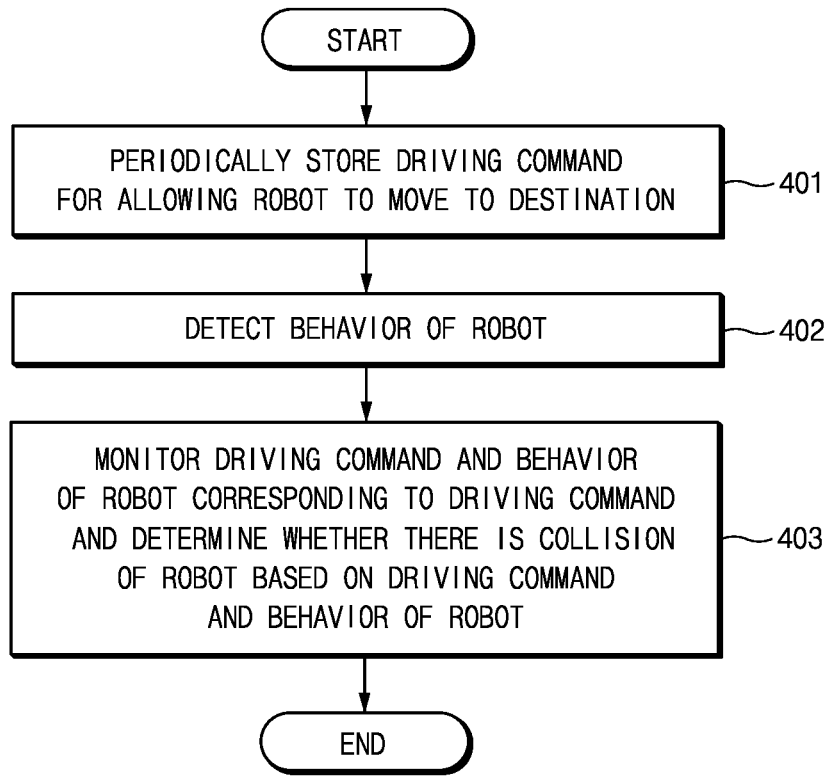
FIG. 4 is a flowchart of a method for detecting a collision of a robot according to an embodiment of the present disclosure.

FIG. 4 is a flowchart of a robot collision detection method according to an embodiment of the present disclosure. First, the buffer 20 may be configured to periodically store a driving command for allowing the robot to move to the destination (401). Then, the IMU 30 may be configured to detect a behavior of the robot (402). Then, the controller 40 may be configured to monitor the driving command and a behavior of the robot corresponding to the driving command, and determine whether there is a robot collision based on the driving command and the behavior of the robot (403).

Figure 5:
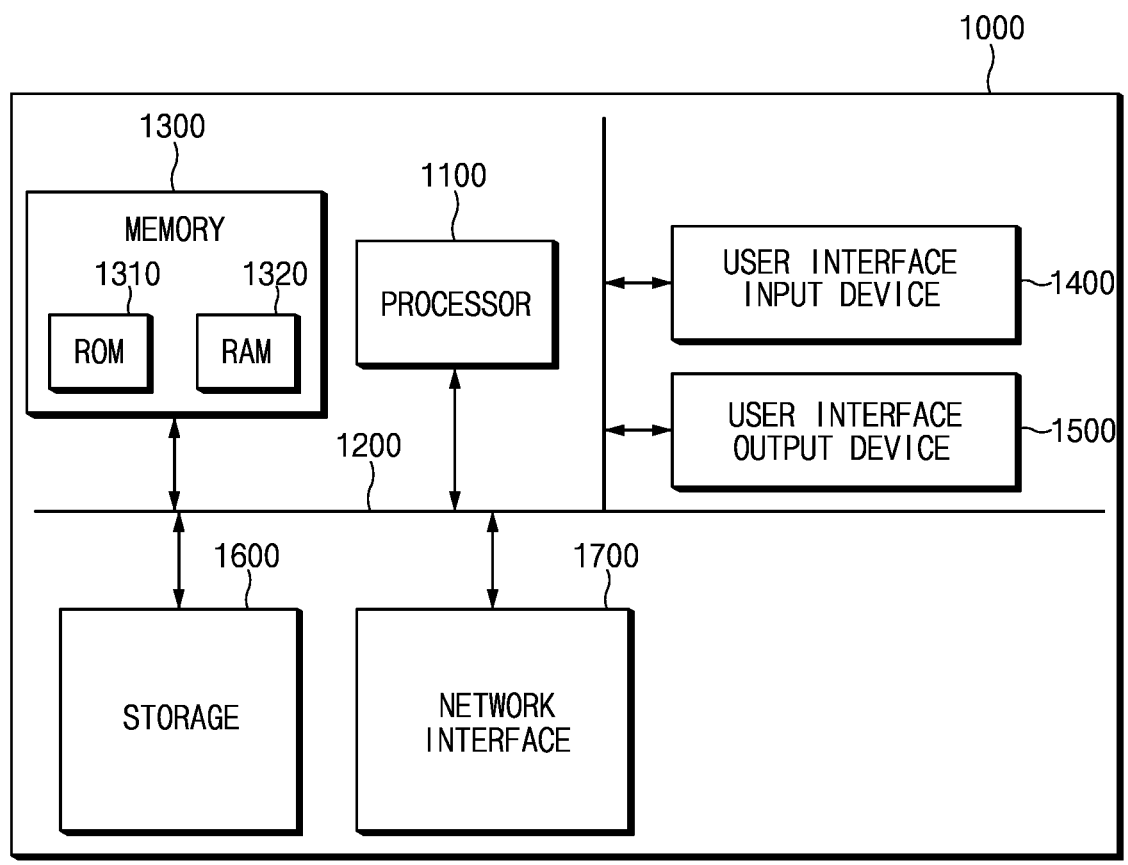
FIG. 5 is a block diagram showing a computing system for executing the method for detecting a collision of a robot according to an embodiment of the present disclosure.

FIG. 5 is a block diagram illustrating a computing system for performing a robot collision detection method according to an embodiment of the present disclosure. Referring to FIG. 5, the robot collision detection method according to the embodiment of the present disclosure described above may be implemented through a computing system. A computing system 1000 may include at least one processor 1100, a memory 1300, a user interface input device 1400, a user interface output device 1500, storage 1600, and a network interface 1700, which are connected with each other via a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD) a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present invention.

According to a robot collision detection device and method according to an embodiment of the present disclosure, it is possible to monitor a driving command for allowing a robot to move to a destination and a behavior of the robot corresponding to the driving command and determine whether there is a collision based on a difference between the driving command and the behavior to quickly and accurately detect a collision of a robot, thereby preventing further damage that may occur in the robot in advance.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A robot collision detection device, comprising:
a buffer configured to periodically store a driving command for allowing a robot to move to a destination;
a sensor configured to detect a behavior of the robot;
a controller configured to monitor the driving command and a behavior of the robot corresponding to the driving command, and determine whether there is a robot collision based on the driving command and the behavior of the robot; and
a storage configured to:
store a first lookup table in which a delay time between a speed of the robot and the driving command corresponding to the speed of the robot is recorded; and
store a second lookup table in which reference values are recorded for speeds of the robot;
wherein the controller is configured to detect, from the buffer, the driving command corresponding to the behavior of the robot detected by the sensor based on the first lookup table.

2. The robot collision detection device of claim 1, wherein the driving command contains a speed and an angular velocity, and wherein the sensor is configured to measure an acceleration and an angular velocity of the robot.

3. The robot collision detection device of claim 1, wherein the controller is configured to calculate the speed of the robot by integrating the acceleration of the robot measured by the sensor, detect a delay time in the first lookup table using the calculated speed of the robot, and detect, from the buffer, a driving command matching the behavior of the robot detected by the sensor based on the delay time.

4. The robot collision detection device of claim 3, wherein the controller is configured to calculate a difference (D) between the speed and the angular velocity of the robot and a speed and an angular velocity of the driving command matching the speed and the angular velocity based on the following Equation 1:

$$D = \alpha \times \sum_{i=x,y,z} \max(v_i^{DC} - v_i^{IMU}, 0) + \beta \times \sum_{i=x,y,z} \max(\omega_i^{DC} - \omega_i^{IMU}, 0)$$

Equation 1 wherein i denotes three axes, 'max' denotes an operator that selects a larger value from two values, v denotes a speed, ω denotes an angular velocity, α and β denote constants, each meaning a weight, DC represents a driving command, and IMU represents a behavior of the robot.

5. The robot collision detection device of claim 4, wherein the controller is configured to detect a reference value corresponding to the behavior of the robot detected by the sensor based on the second lookup table.

6. The robot collision detection device of claim 5, wherein the controller is configured to determine that a collision has occurred in the robot when the calculated difference (D) exceeds the detected reference value.

7. The robot collision detection device of claim 1, wherein the controller is configured to stop the robot by generating a braking signal in response to determining that a collision has occurred in the robot.

8. The robot collision detection device of claim 1, wherein the controller is configured to audibly or visually output that a collision has occurred in response to determining that the collision has occurred in the robot.

9. The robot collision detection device of claim 1, wherein the controller is configured to notify an administrator terminal or a control server that a collision has occurred in response to determining that the collision has occurred in the robot.

10. The robot collision detection device of claim 1, wherein the controller is configured to generate z-axis speed data based on 3D map data, and determine whether the robot has passed by an object based on the z-axis speed data.

11. The robot collision detection device of claim 1, wherein the sensor is an Inertial Measurement Unit (IMU).

12. A robot collision detection method, comprising:
periodically storing, by a buffer, a driving command for allowing a robot to move to a destination;
detecting, by a sensor, a behavior of the robot;
monitoring, by a controller, the driving command and a behavior of the robot corresponding to the driving command,
determining, by the controller, whether there is a robot collision based on the driving command and the behavior of the robot;
storing, by a storage, a first lookup table in which a delay time between the speed of the robot and the driving command corresponding to the speed of the robot is recorded; and
storing, by the storage, a second lookup table in which reference values are recorded for speeds of the robot;
wherein the determining of whether there is the robot collision includes detecting a driving command corresponding to the behavior of the robot detected by the sensor from the buffer based on the first lookup table.

13. The robot collision detection method of claim 12, wherein the driving command contains a speed and an angular velocity, and wherein the sensor is configured to measure an acceleration and an annular velocity of the robot.

14. The robot collision detection method of claim 12, wherein the determining of whether there is the robot collision includes:
calculating a speed of the robot by integrating the acceleration of the robot measured by the sensor;
detecting a delay time from the first lookup table using the calculated speed of the robot; and
detecting, from the buffer, a driving command matching the behavior of the robot detected by the sensor based on the delay time.

15. The robot collision detection method of claim 14, wherein the determining of whether there is a robot collision includes:
calculating a difference (D) between a speed and an angular velocity of the robot and a speed and an angular velocity of the driving command matching the speed and the angular velocity of the robot;
detecting a reference value corresponding to the behavior of the robot detected by the sensor based on the second lookup table; and
determining that a collision has occurred in the robot when the calculated difference (D) exceeds the detected reference value.

16. The robot collision detection method of claim 15, wherein the calculating of the difference D includes calculating the difference (D) using the following Equation 1:

$$D = \alpha \times \sum_{i=x,y,z} \max(v_i^{DC} - v_i^{IMU}, 0) + \beta \times \sum_{i=x,y,z} \max(\omega_i^{DC} - \omega_i^{IMU}, 0) \qquad \text{Equation 1}$$

wherein i denotes three axes, 'max' denotes an operator that selects a larger value from two values, v denotes a speed, ω denotes an angular velocity, α and β denote constants, each meaning a weight, DC represents a driving command, and IMU represents a behavior of the robot.

* * * * *